United States Patent
Dai et al.

(10) Patent No.: US 9,156,721 B2
(45) Date of Patent: Oct. 13, 2015

(54) METHOD FOR CUTTING CHEMICALLY STRENGTHENED GLASS

(71) Applicant: HON HAI PRECISION INDUSTRY CO., LTD., New Taipei (TW)

(72) Inventors: Feng-Yuen Dai, New Taipei (TW); Hung-Lien Yeh, New Taipei (TW); Chung-Pei Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 23 days.

(21) Appl. No.: 14/140,462

(22) Filed: Dec. 24, 2013

(65) Prior Publication Data
US 2015/0089978 A1  Apr. 2, 2015

(30) Foreign Application Priority Data
Sep. 30, 2013 (CN) .......................... 2013 1 04577189

(51) Int. Cl.
*C03B 33/08* (2006.01)
*C03B 33/07* (2006.01)

(52) U.S. Cl.
CPC .............. *C03B 33/082* (2013.01); *C03B 33/072* (2013.01)

(58) Field of Classification Search
CPC  C03B 33/072; C03B 33/082; C03C 23/0025; B23K 26/0054; B23K 26/063; B23K 26/0635
See application file for complete search history.

(56) References Cited

U.S. PATENT DOCUMENTS

| | | | |
|---|---|---|---|
| 2005/0218122 A1* | 10/2005 | Yamamoto et al. | 219/121.61 |
| 2013/0221053 A1* | 8/2013 | Zhang | 225/2 |
| 2013/0224433 A1* | 8/2013 | Matsumoto et al. | 428/131 |

* cited by examiner

*Primary Examiner* — Queenie Dehghan
(74) *Attorney, Agent, or Firm* — Novak Druce Connolly Bove + Quigg LLP

(57) ABSTRACT

A method for cutting chemically strengthened glass is provided. The chemically strengthened glass includes a first stress layer, a second stress layer, and a tension layer sandwich between the first stress layer and the second stress layer. The method includes: using a green pulsed laser to cut the first stress layer, wherein the green pulsed laser includes a first green pulsed laser having femtosecond level and a second green pulsed laser having nanosecond level; using a ultraviolet pulsed laser to cut the tension layer, wherein the ultraviolet pulsed laser includes a first ultraviolet pulsed laser having femtosecond level and a second ultraviolet pulsed laser having nanosecond level; and using the green pulse layer to cut the second stress layer.

6 Claims, 4 Drawing Sheets

METHOD FOR CUTTING CHEMICALLY STRENGTHENED GLASS

BACKGROUND

1. Technical Field

The present disclosure relates to methods for cutting glass and, particularly, to a method for cutting chemically strengthened glass.

2. Description of Related Art

Common glass is not directly used in electronic devices. The common glass includes sodium silicate. After the common glass is strengthened then it is used in electronic devices. The common glass is put into nitrate of potassium ($KNO_3$) solution and K ions of the solution take the place of Na ions of the common glass. Thus chemically strengthened glass is obtained.

The chemically strengthened glass is cut into different sizes by Computer Numerical Control (CNC) technology. But, the chemically strengthened glass has a burr after being cut.

Therefore, it is desirable to provide a method for cutting chemically strengthened glass, which can overcome the limitation described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
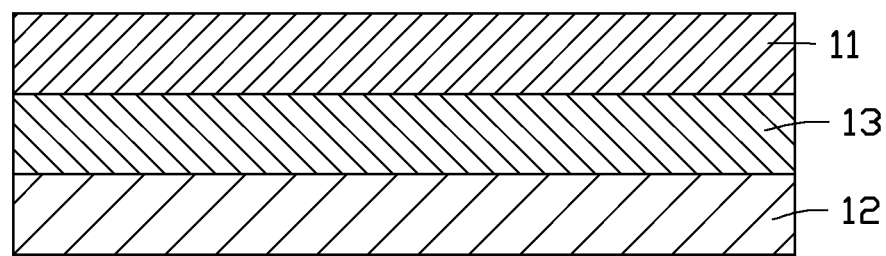
FIG. 1 is a schematic view of a chemically strengthened glass, according to an exemplary embodiment of the present disclosure.

FIG. 1 shows an exemplary embodiment of chemically strengthened glass 10. The glass 10 includes a first stress layer 11, a second stress layer 12, and a tension layer 13. The tension layer 13 is sandwich between the first stress layer 11 and the second stress layer 12.

The first stress layer 11 and the second stress layer 12 keep a compression stress in order to enhance intensity of the glass 10. The tension layer 13 is kept under a tension stress to compensate a compression stress of the first stress layer 11 and the second stress layer 12. The compression stress is kept in balance with the tension stress and thus the glass 10 is hard to be broken.

The first stress layer 11, the second stress layer 12, and the tension layer 13 have different diffractive coefficients, thus a polarized light can be used to identify the first stress layer 11, the second stress layer 12, and the tension layer 13.

Figure 2:
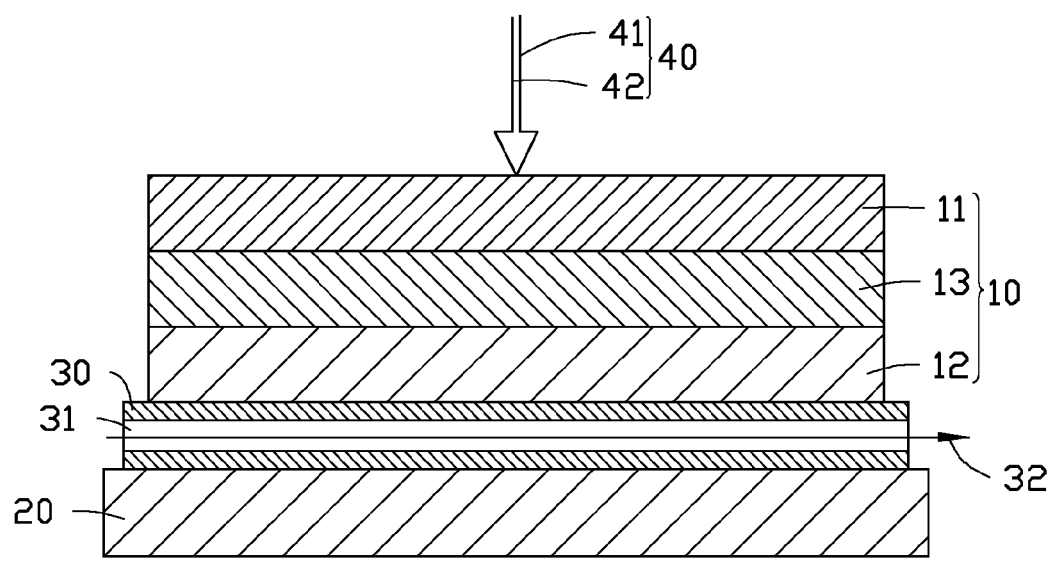
FIG. 2 is a schematic view of cutting a first stress layer of the chemically strengthened glass of FIG. 1.

FIG. 2 shows that before cutting the glass 10, the glass 10 is located on a cooling device 30 and the cooling device 30 is set on a platform 20. The cooling device 30 has a size equal to and larger than the glass 10 so the whole glass 10 is on the cooling device 30. The cooling device 30 includes a runner 31 and a cooling medial 32 is held in the runner 31. The cooling medial 32 can flow in the runner 31 back and forth to cool the glass 10.

In other embodiment, the cooling device 30 is under the platform 20. The cooling medial 32 is selected from the group consisting of water and alcohol.

A green pulsed laser 40 is used to cut the first stress layer 11. The green pulsed laser 40 includes a first green pulsed laser 41 and a second green pulsed laser 42. A pulse width of the first green pulsed laser 41 is femtosecond (fs) level and a pulse width of the second green pulsed laser 42 is nanosecond (ns) level. Wavelength of the first green pulsed laser 41 is 532 nanometers. Wavelength of the second green pulsed laser 42 is also 532 nanometers.

Different laser sources emit the first green pulsed laser 41 and the second green pulsed laser 42. The first green pulsed laser 41 and the second green pulsed laser 42 converge and then radiate on the first stress layer 11 at the same time. The green pulsed laser 40 moves towards the tension layer 13, the first stress layer 11 is cut open along a line. A polarized light is used to confirm if the first stress layer 11 is cut open or not.

Figure 3:
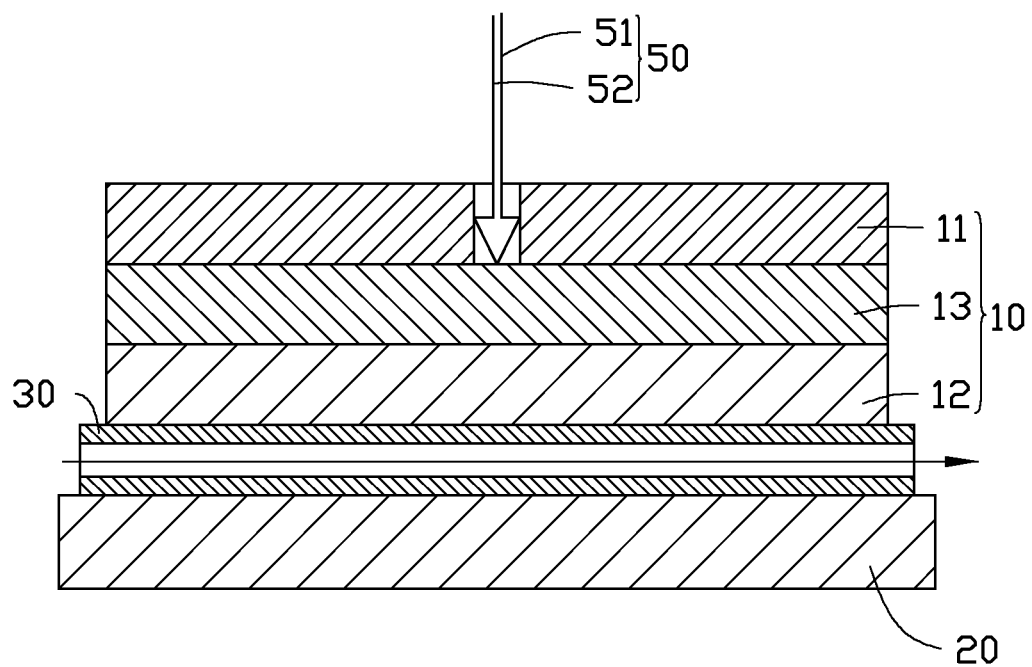
FIG. 3 is a schematic view of cutting a tension layer of the chemically strengthened glass of FIG. 1.

FIG. 3 shows that a ultraviolet pulsed laser 50 is used to cut the tension layer 13 after the first stress layer 11 is cut by the green pulsed laser 40. The ultraviolet pulsed laser 50 includes a first ultraviolet pulsed laser 51 and a second ultraviolet pulsed laser 52. A pulse width of the first ultraviolet pulsed laser 51 is femtosecond level and a pulse width of the second ultraviolet pulsed laser 52 is nanosecond level. Wavelength of the first ultraviolet pulsed laser 51 is 335 nanometers. Wavelength of the second ultraviolet pulsed laser 52 is also 335 nanometers.

Different laser sources emit the first ultraviolet pulsed laser 51 and the second ultraviolet pulsed laser 52. The first ultraviolet pulsed laser 51 and the second ultraviolet pulsed laser 52 converge and then radiate on the tension layer 13 at the same time. The ultraviolet pulsed laser 50 moves towards the second stress layer 12 and then the tension layer 13 is cut open along a line. A polarized light is used to confirm if the tension layer 13 is cut open or not.

The green pulsed laser 40 and the ultraviolet pulsed laser 50 are magnified and shown in the figures.

Figure 4:
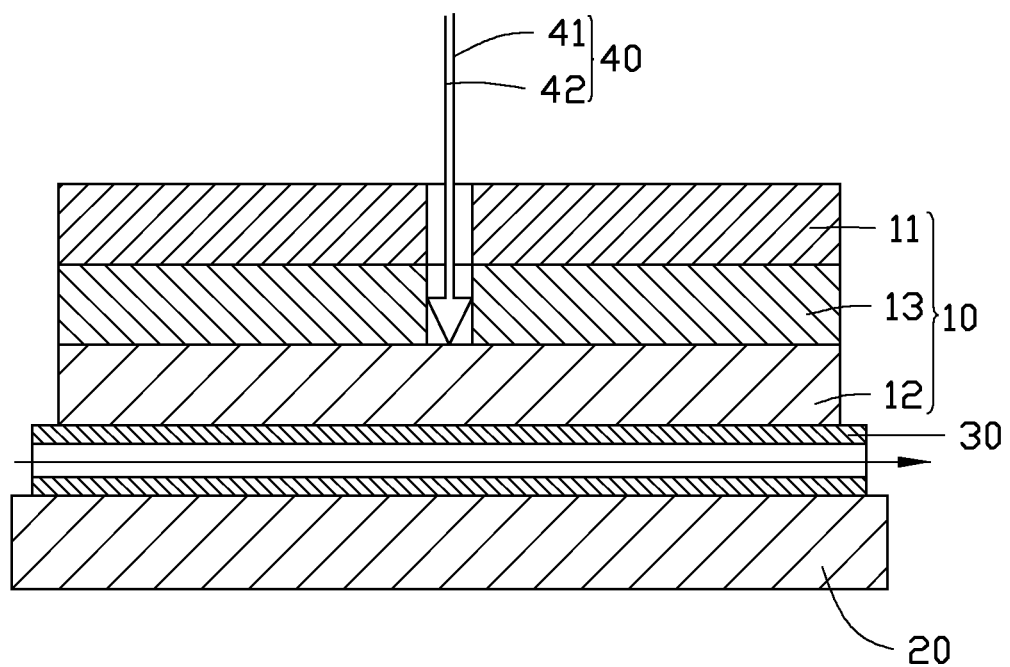
FIG. 4 is a schematic view of cutting a second stress layer of the chemically strengthened glass of FIG. 1.

FIG. 4 shows that the green pulsed laser 40 is used to cut the second stress layer 12 after the tension layer 13 is cut open along a line.

The green pulsed laser 40 is used to cut the first stress layer 11 and the second stress layer 12. The ultraviolet pulsed laser 50 is used to cut the tension layer 13. Pulse width of the green pulsed laser 40 and the ultraviolet pulsed laser 50 are femtosecond level and nanosecond level. Therefore, the green pulsed laser 40 and the ultraviolet pulsed laser 50 are short pulsed lasers. The short pulsed laser can generate plasma to enhance quality of cutting the glass 10 and burr is not generated.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely exemplary embodiments of the disclosure.

What is claimed is:

1. A method for cutting chemically strengthened glass, the chemically strengthened glass comprising a first stress layer, a second stress layer, and a tension layer sandwich between the first stress layer and the second stress layer, the method comprising:

using a green pulsed laser to cut the first stress layer, wherein the green pulsed laser comprises a first green pulsed laser having a pulse width of femtosecond level and a second green pulsed laser having a pulse width of nanosecond level;

using a ultraviolet pulsed laser to cut the tension layer, wherein the ultraviolet pulsed laser comprises a first ultraviolet pulsed laser having a pulse width of femtosecond level and a second ultraviolet pulsed laser having a pulse width of nanosecond level; and using the green pulsed laser to cut the second stress layer.

2. The method of claim 1, wherein the chemically strengthened glass is located on a cooling device.

3. The method of claim 2, wherein the cooling device has a same shape as the chemically strengthened glass.

4. The method of claim 2, wherein the cooling device has a bigger size than the chemically strengthened glass.

5. The method of claim 2, wherein the cooling device holds water to cool the chemically strengthened glass.

6. The method of claim 1, wherein a polarized light is used to detect whether the first stress layer and the tension layer are cut.

* * * * *